United States Patent [19]

Yale

[11] Patent Number: 5,013,582

[45] Date of Patent: May 7, 1991

[54] PROCESS FOR PROVIDING HYDROLYSIS RESISTANT PHOSPHORS

[75] Inventor: Ramon L. Yale, Towanda, Pa.

[73] Assignee: GTE Products Corporation, Stamford, Conn.

[21] Appl. No.: 342,159

[22] Filed: Apr. 24, 1989

[51] Int. Cl.$^5$ .............................................. C09K 11/84
[52] U.S. Cl. .............................. 427/65; 252/301.4 S; 252/301.6 S; 427/215; 427/372.2
[58] Field of Search .................. 252/301.4 S, 301.6 S; 427/65, 215, 372.2

[56] References Cited

U.S. PATENT DOCUMENTS

| | | | |
|---|---|---|---|
| 4,507,560 | 3/1985 | Mathers et al. | 252/301.4 S |
| 4,568,479 | 2/1986 | Trond et al. | 252/301.6 S |
| 4,624,861 | 11/1986 | Yale et al. | 427/65 |
| 4,690,832 | 9/1987 | Yale | 427/65 |

Primary Examiner—Jack Cooper
Attorney, Agent, or Firm—L. Rita Quatrini; Robert E. Walter

[57] ABSTRACT

A process is disclosed for making a rare-earth oxysulfide phosphor resistant to hydrolysis, which comprises forming a slurry of the phosphor in water, adding to the slurry, a zinc compound in an amount sufficient to result in a zinc ion concentration in the water of from about 0.01 molar to about 0.05 molar, separating the resulting zinc-treated phosphor from the liquid portion of the slurry, heating the zinc-treated phosphor in air at a temperature of from about 500° C. to about 600° C. for a sufficient time to enhance the brightness of the phosphor, and screening the resulting heated phosphor to remove non-luminescent material therefrom. The phosphor has a resistance to hydrolysis that is at least about 50% greater than phosphors produced without the zinc treatment.

2 Claims, No Drawings

PROCESS FOR PROVIDING HYDROLYSIS RESISTANT PHOSPHORS

CROSS REFERENCE TO RELATED APPLICATION

This application is related to application Ser. No. 341,887, now Pat. No. 4,925,594, entitled "Improved Hydrolysis Resistance Of Rare Earth Oxysulfides By The Addition of Zinc Compounds In Synthesis," filed concurrently herewith and assigned to the same assignee as the present application.

BACKGROUND OF THE INVENTION

This invention relates to a process for imparting hydrolysis resistance to rare-earth oxysulfide phosphors by a slurry method in which the phosphor is slurried in an aqueous slurry with a zinc compound prior to heat-treating. The hydrolysis resistance is improved by over 50% when compared with phosphors that do not receive this zinc treatment.

Rare-earth oxysulfide phosphors have become successful x-ray intensifier phosphors. In this application the phosphor is applied to an organic film or substrate which forms the basis of an intensifier screen. The screen is mounted in a cassette where in operation the phosphor thereon is exposed to x rays. The phosphor converts the x rays into visible or near-visible radiation to which a photosensitive film is exposed resulting in an image being produced on the film.

One of the problems that has developed in the above application is that if the phosphor comes in contact with water, hydrolytic reaction can occur and hydrogen sulfide is released. Additionally, if water is inadvertently dropped on an intensifier screen in an x-ray cassette and a film is placed in the cassette, a reaction between hydrogen sulfide and the silver halide in the film emulsion occurs. This reaction can cause a discoloration on the intensifying screen which in turn can degrade radiographic image quality.

SUMMARY OF THE INVENTION

In accordance with one aspect of the invention, there is provided a method for making a rare-earth oxysulfide phosphor resistant to hydrolysis, which comprises forming a slurry of the phosphor in water, adding to the slurry, a zinc compound in an amount sufficient to result in a zinc ion concentration in the water of from about 0.01 molar to about 0.05 molar, separating the resulting zinc-treated phosphor from the liquid portion of the slurry, heating the zinc-treated phosphor in air at a temperature of from about 500° C. to about 600° C. for a sufficient time to enhance the brightness of the phosphor, and screening the resulting heated phosphor to remove non-luminescent material therefrom. The phosphor has a resistance to hydrolysis of at least about 50% greater than phosphors absent the zinc treatment.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By the process of this invention, a rare-earth oxysulfide phosphor is made resistant to hydrolysis by addition of a zinc compound to the phosphor in a slurry prior to heat-treating. This process is essentially a surface treatment of the phosphor particles.

The starting rare-earth oxysulfide phosphor to be made hydrolysis resistant consists essentially of a host which is preferably gadolinium oxysulfide, yttrium oxysulfide, gadolinium-yttrium oxysulfide, and lanthanum oxysulfide, and from about 0.001 moles to about 0.10 moles of terbium per mole of host as an activator.

It is desirable that the starting phosphor be washed with deionized water to remove water soluble impurities such as polysulfides that result from the processing to produce the phosphor.

A slurry is first formed of the phosphor in water, preferably deionized water. Generally from about 1 to about 10 weight parts of water are used per part of the starting phosphor.

To the slurry is added a water soluble zinc compound. Some zinc compounds which can be used are zinc sulfate, zinc nitrate, and zinc chloride. The zinc compound is added in an amount sufficient to result in a zinc ion concentration in the water of from about 0.01 molar to about 0.05 molar. The slurry is agitated for a period of time to insure that the solids are well dispersed in the liquid portion. Typically the slurrying is done at an elevated temperature.

The resulting zinc-treated phosphor is then separated from the liquid portion of the slurry by any standard technique such as filtration.

It is common practice to normally dry the zinc-treated phosphor after it is separated from the liquid portion of the slurry to remove all moisture.

Typically the dried phosphor is deagglomerated as by dry milling.

The dried zinc-treated phosphor is then transferred to a vessel capable of withstanding higher temperatures for the subsequent heat-treating or annealing step.

The zinc-treated phosphor is then heat-treated in air normally in a covered vessel at a temperature of from about 500° C. to about 600° C. for a sufficient time to enhance the brightness or light output of the phosphor. The time of heating is dependent on factors as temperature, size of the charge, the nature of the equipment, etc. The preferred heating conditions are a temperature of from about 525° C. to about 590° C. for a time of from about 1.5 hours to about 3.0 hours.

The heated phosphor is then screened preferably through a 400 mesh sieve to remove any non-luminescent, extraneous, or out-of-size material such as material having a particle size larger than about 38 micrometers in diameter.

The resulting phosphor exhibits an increased resistance to hydrolysis over phosphors not treated with zinc. Usually there is a 50% or more reduction in hydrolysis with use of zinc according to the present invention.

The following table shows relative hydrolysis resistance of phosphors treated with different zinc compounds as opposed to non-treated samples which serve as the controls.

TABLE

| # | Description | Relative Hydrolysis Resistance |
|---|---|---|
| 1 | Control - phosphor as is (no Zn) | 0 |
| 2 | Zinc sulfate .02 molar | 64 |
| 3 | Zinc nitrate .02 molar | 62 |

The above phosphors were slurried with the zinc under identical conditions of time and temperature and were annealed under the same temperature and time conditions.

Another set of data is given below. The phosphors were slurried under the same temperature and time conditions and annealed under the same conditions of temperature and time.

| # | Description | Relative Hydrolysis Resistance |
|---|---|---|
| 4 | Control (phosphor as in no Zn) | 0 |
| 5 | Zinc sulfate .02 molar | 73 |
| 6 | Zinc sulfate .04 molar | 79 |
| 7 | zinc chloride .04 molar | 65 |

It can be seen that when all factors are constant, the hydrolysis resistance of the zinc-treated phosphors is significantly greater than that of the untreated phosphors.

To more fully illustrate this invention, the following non-limiting example is presented. All parts, portions and percentages are by weight unless otherwise stated.

EXAMPLE

About 200 parts of terbium-activated gadolinium oxysulfide that has been water washed free of soluble sodium polysulfides is suspended in about 550 parts of deionized water at about 50° C. About 3.3 parts of $Zn(NO_3)_2 \cdot 6H_2O$ is added to the slurry to give a $Zn^{++}$ concentration of about 0.02 molar. After about 10 minutes of slurrying, the phosphor is filtered and dried. It is then heat treated for about 2 hours at 525° C. in air and sieved through a 400 mesh sieve. The resultant material has a relative hydrolysis that is about 60-80% lower than a control sample that does not receive the $Zn(NO_3)_2 \cdot 6H_2O$ treatment.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for making a rare-earth oxysulfide phosphor resistant to hydrolysis, said process comprising:
    (a) forming a slurry of said phosphor in water;
    (b) treating said slurry with a zinc compound, said treating consisting of adding to said slurry, a water-soluble zinc compound in an amount sufficient to result in a zinc ion concentration in said water of from about 0.01 molar to about 0.05 molar, and agitating said slurry;
    (c) separating the resulting zinc-treated phosphor from the liquid portion of said slurry;
    (d) heating said zinc-treated phosphor in air at a temperature of from about 500° C. to about 600° C. for a sufficient time to enhance the brightness of said phosphor; and
    (e) screening the resulting heated phosphor to remove nonluminescent material therefrom, said phosphor having a resistance to hydrolysis that is at least about 50% greater than said rare-earth oxysulfide phosphor absent the zinc treatment.

2. A process of claim 1 wherein said phosphor consists essentially of a host selected from the group consisting of gadolinium oxysulfide, yttrium oxysulfide, gadolinium-yttrium oxysulfide, and lanthanum oxysulfide, and from about 0.001 moles to about 0.10 moles of terbium per mole of host as an activator.

* * * * *